March 8, 1966     H. A. SMITH     3,238,977
SPRING END JOINING MACHINE
Filed Aug. 12, 1963     5 Sheets-Sheet 1

March 8, 1966     H. A. SMITH     3,238,977
SPRING END JOINING MACHINE
Filed Aug. 12, 1963     5 Sheets-Sheet 3
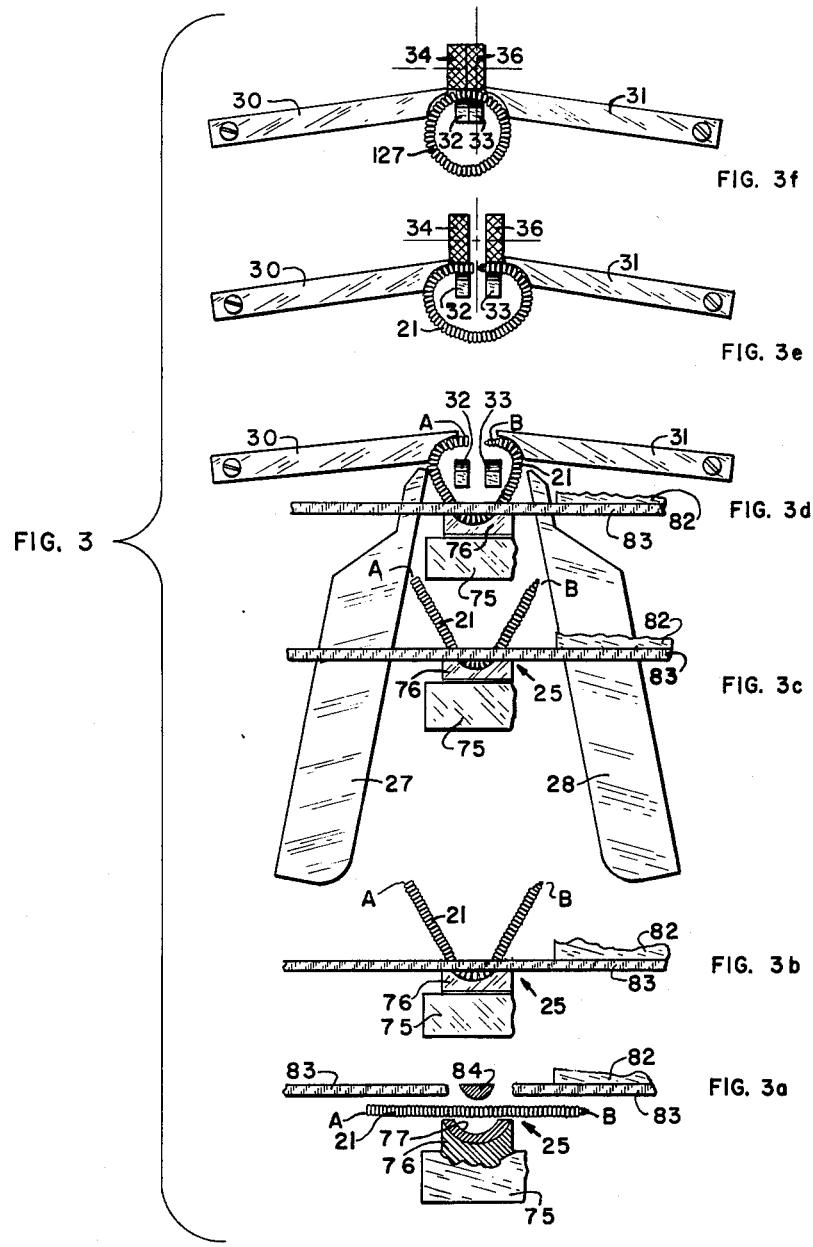

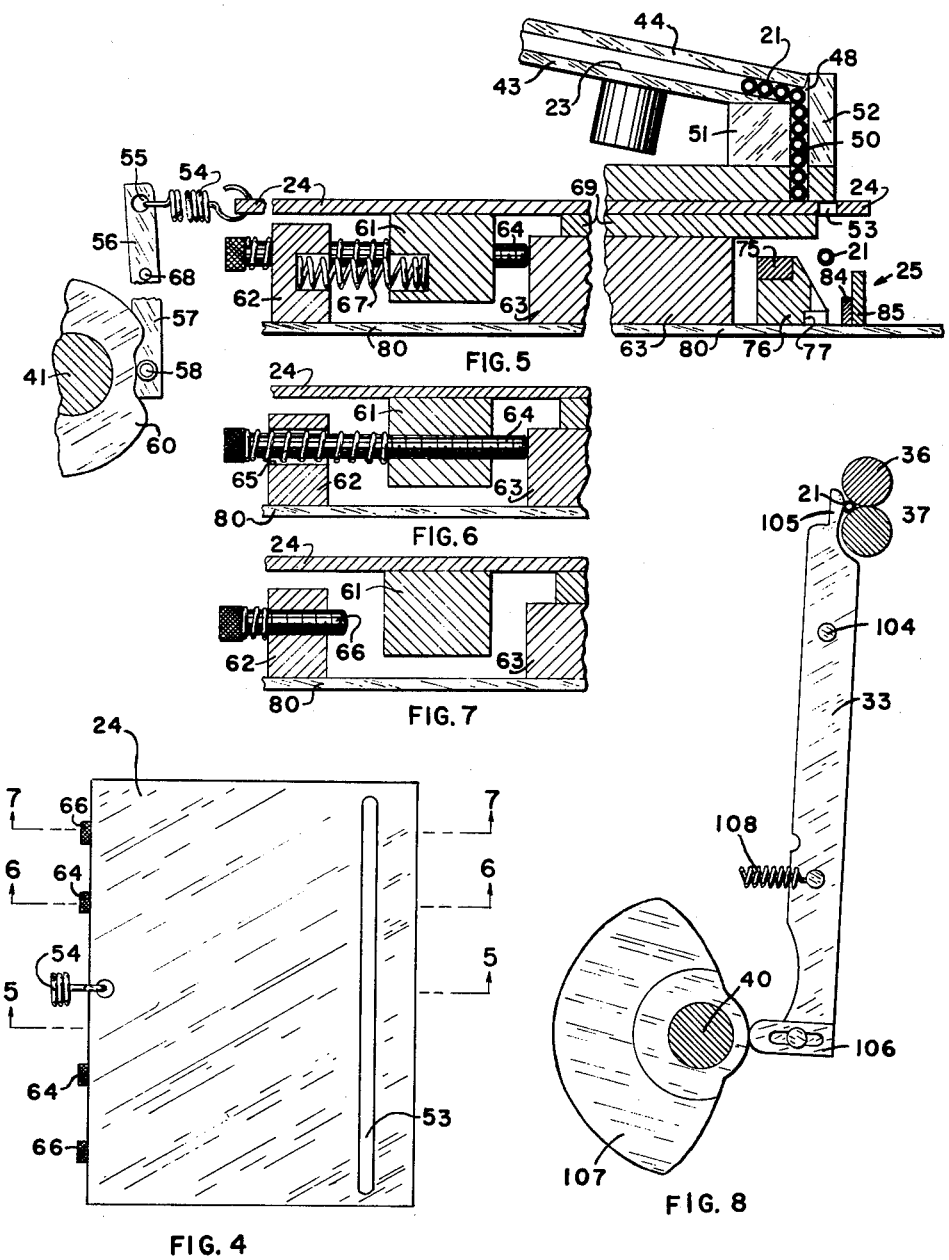

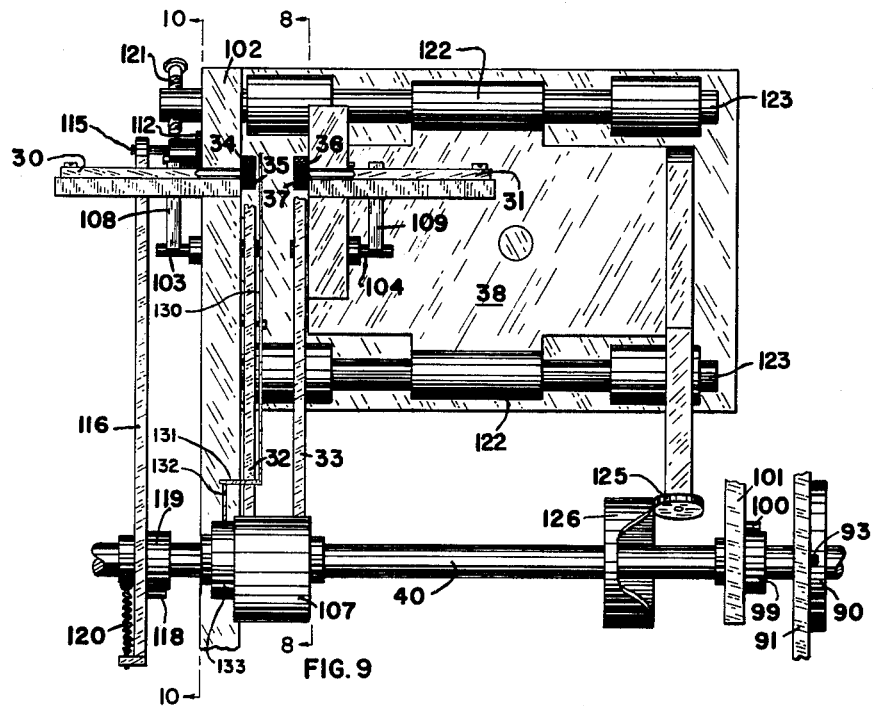
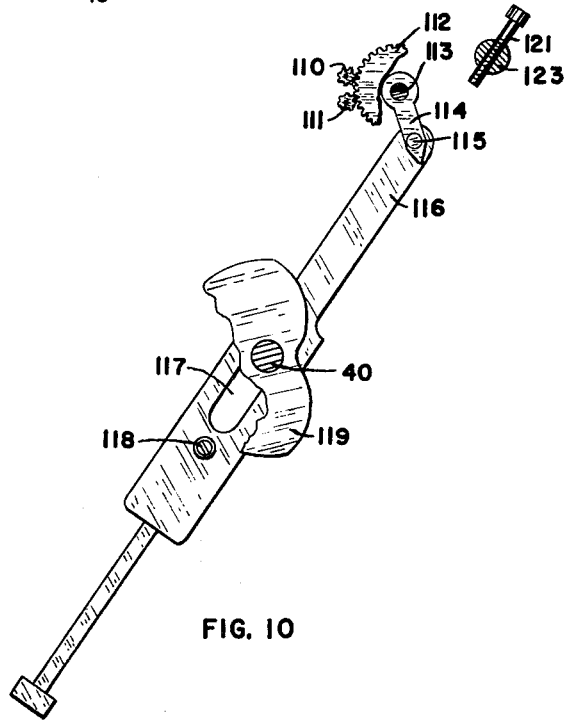

United States Patent Office 3,238,977
Patented Mar. 8, 1966

3,238,977
SPRING END JOINING MACHINE
Harold A. Smith, St. Paul, Minn., assignor to Federal-Mogul Corporation, a corporation of Michigan
Filed Aug. 12, 1963, Ser. No. 301,424
6 Claims. (Cl. 140—71)

This invention relates to a machine for joining spring ends together. More particularly, it relates to a machine for joining the ends of a helical spring to form a circular loop spring of the type usually known as a greater spring.

Garter springs have many uses. For example, the oil seal industry employs garter springs to maintain an even distribution of gentle radially inward pressure on a shaft-engaging lip of an annular radial-lip shaft seal. Garter springs are made by first winding spring wire into a helical coil spring and then joining together the ends of the helix. The first step, that of winding the helical spring, is done very efficiently by apparatus such as that shown in U.S. Patent 2,845,987 to Harry J. McCullough. One end of the helix is formed with a smaller-diameter terminal portion or nib, so that this smaller end may later be inserted into the other, large, end and locked there. The larger end is usually completed by cutting off a tail portion, trimming the spring to the exact length desired, so that when the ends are joined, a spring of precise circumference is produced.

It might seem simple to join the spring ends together. However, this is not so, for it is quite difficult to make the loop and join the ends entirely by machine while maintaining dimensional uniformity so that every spring in a series has exactly the same circumference, and it is difficult to lock the ends of the spring together without leaving a twisting moment on the spring. For example, if the spring is joined by making a simple loop, inserting the smaller end into the larger end, and then giving either end a few turns, there will be such a twisting moment, and it will tend to turn the spring from its circular shape into a figure-8.

A very successful machine for joining together the ends of springs is shown in the Smith, et al. patent application, Serial No. 793,393, filed February 16, 1959, now Patent No. 3,079,956. However, that machine and the method it employs are inapplicable to short springs, for it is not practical to force a very short helical spring into a circular die, as is done there. Even after that invention, the short springs had to have their ends joined by hand or by hand-controlled machines carefully watched by the operator.

An important object of the present invention is to automate the joining of the ends of quite short springs.

Another object of the present invention is to provide a fully automatic end-joining machine for use with short helical springs. Helical coil springs made by a spring making machine may be dropped, after trimming, into a hopper of a machine of this invention and issue at the other end of the present machine as circular coiled springs having exactly the desired circumference and without any tendency to twist into a figure-8.

Other objects of the invention are to provide a precision spring joining machine, to produce garter springs of an exact predetermined circumference, to provide a spring joining machine that locks the ends of springs together without imposing a twisting moment upon the springs, and to provide a nextremely rapid and fool-proof spring joining machine for short length coil springs.

Other objects and advantages of the invention will appear from the description of a preferred embodiment of the invention.

In the drawings:

FIG. 3 is a top plan diagrammatic view showing the end-joining sequence resulting from operation of the machine of FIGS. 1 and 2, the various stages being indicated in chronological order as FIGS. 3a, 3b, 3c, 3d, 3e, and 3f.

FIG. 4 is a fragmentary plan view of part of the rear portion of the machine with the spring-feeding hopper removed to show the shuttle plate assembly.

FIG. 5 is an enlarged fragmentary view in side elevation and in section taken along the line 5—5 in FIG. 4 of a portion of the machine showing a shuttle plate spring-feeding arrangement from the hopper to the die and the action of its controlling cam. The view has been broken in the middle in some places to save space.

FIG. 6 is a fragmentary view in section along the line 6—6 in FIG. 4 and on the same scale as FIG. 5.

FIG. 7 is a fragmentary view in section taken along the line 7—7 in FIG. 4, and on the same scale as FIG. 6.

FIG. 8 is an enlarged view in side elevation and in section taken along the line 8—8 in FIG. 9 but showing only one of the spring-joining grippers and its associated cam and rollers.

FIG. 9 is a view in elevation taken generally along the line 9—9 in FIG. 2 with the elements moved apart from each other and shown from one interval end, looking out, rather than in section. Some parts are broken off to conserve space and impart clarity.

FIG. 10 is a fragmentary enlarged view on a smaller scale than FIG. 8 in elevation and partly in section of the spring and rotating mechanism, taken generally along the line 10—10 in FIG. 9 with the controlling cam and gear broken away.

GENERAL OPERATION AND LAYOUT (FIGS. 1–3)

Figure 1:
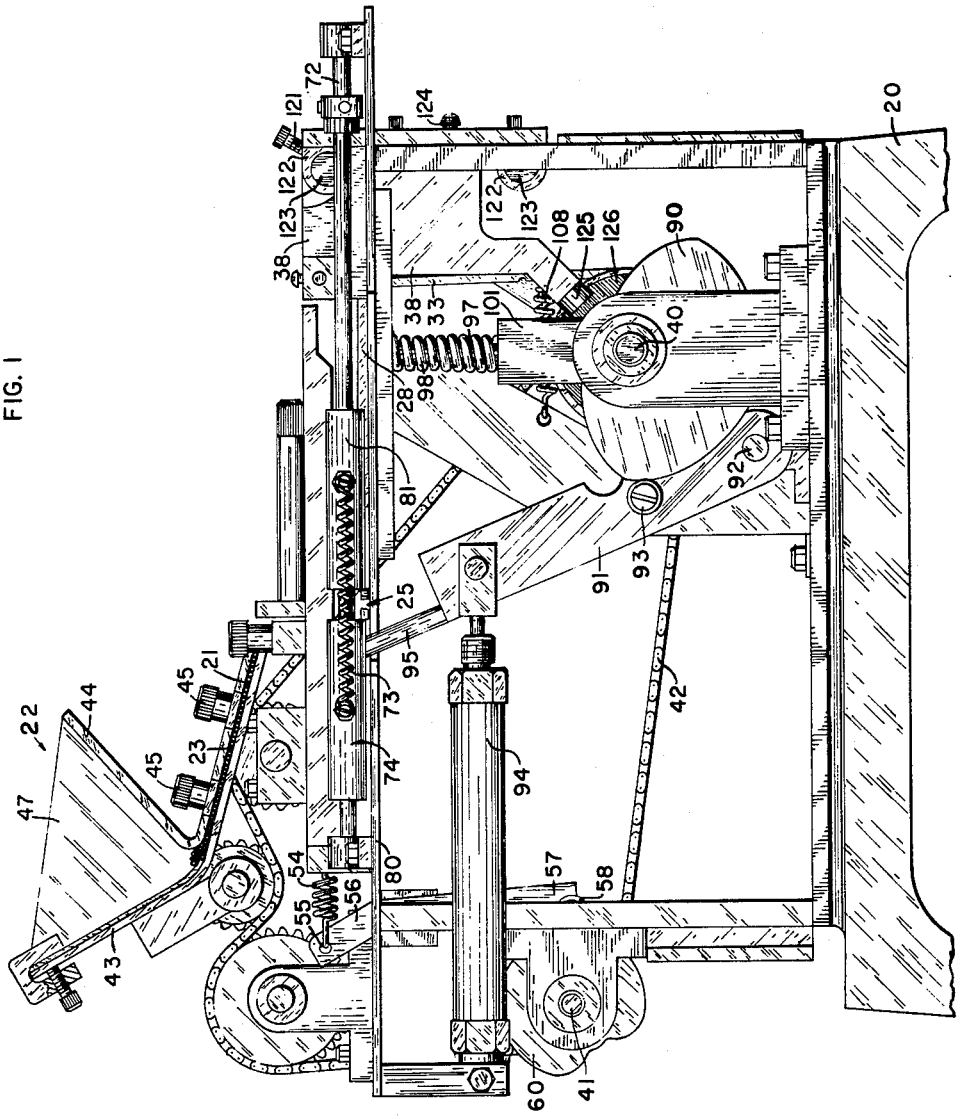
FIG. 1 is a view in side elevation with some portions broken away of a spring-end-joining machine embodying the principles of this invention, the die carriage assembly being shown slightly forward of the rear of its stroke.
Figure 2:
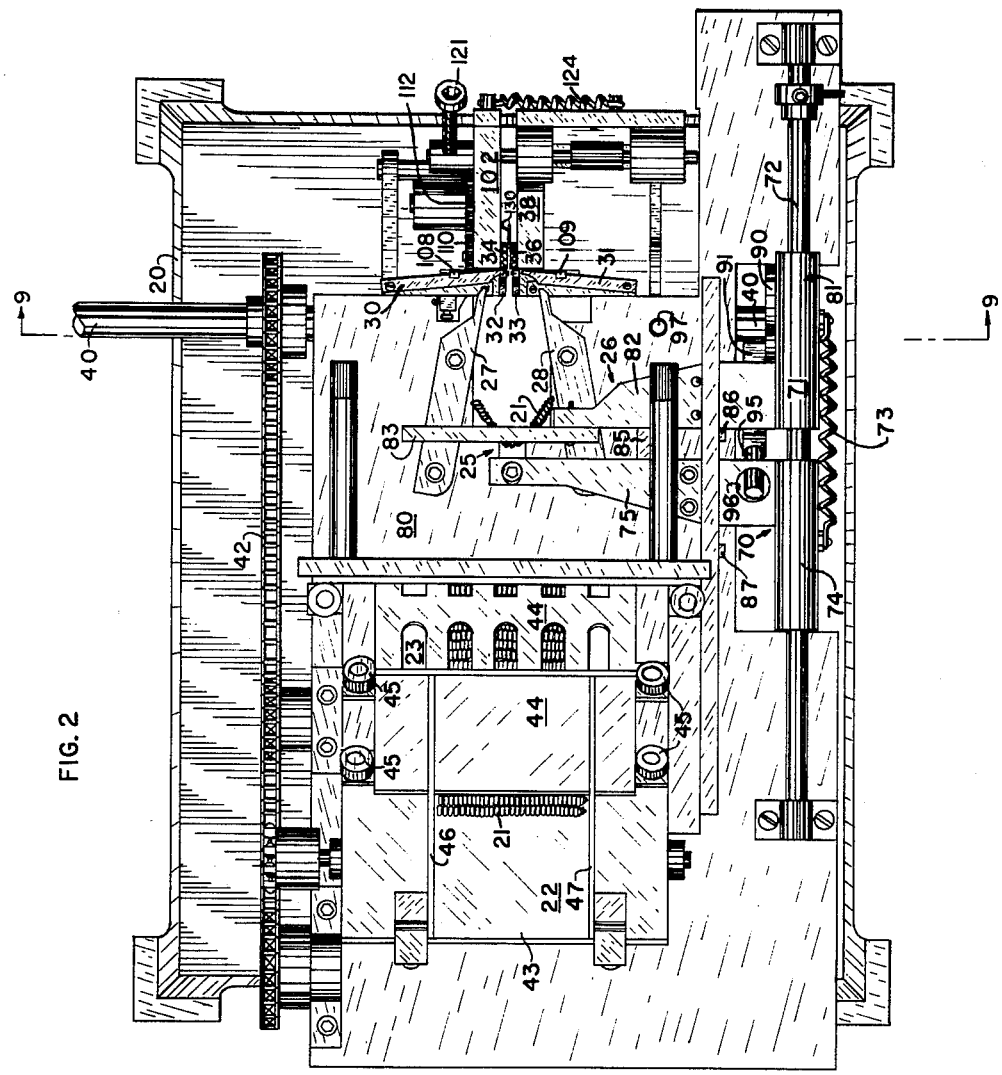
FIG. 2 is a top plan view of the machine of FIG. 1, with the die carriage assembly moved forward about half way on its stroke, and with the drive shaft broken.

As shown in the drawings, the spring-joining machine of this invention has a main supporting frame 20. Cut lengths of straight helical springs 21 are inserted into a hopper 22 and roll down a slide 23. One spring 21 at a time is fed by a shuttle plate 24 into a supporting die 25, which upon closing bends the spring 21 into a generally V-shape. A die carriage assembly 26 moves the die 25 and carries the spring 21 between two converging guides 27 and 28 which flex the outboard ends A and B of the spring 21 and begin leading them toward each other (see FIG. 3). Just beyond the guides 27 and 28 the ends A and B are moved closer toward each other by generally transverse guide members 30 and 31, and then the ends A and B are respectively clamped by idler levers 32 and 33 against a pair of rotatable rollers 34, 35 and a pair of non-rotatable rollers 36, 37 (see also FIG. 8). The rotatable rollers 34, 35 twist one end A of the spring, then a carriage 38 that supports the non-rotatable rollers 36, 37 moves them and their spring end B toward the rollers 34, 35 and moves one end of the spring into the other end. (It makes no difference which end A or B is the smaller end and which the larger end.) After the joining, the rollers 34, 35 rotate their spring end A back to lock the loop together. The basic movements are produced by a motor (not shown) whose drive shaft is coupled to a front cam shaft 40 and also drives a rear cam shaft 41 through a chain 42, each shaft 40 and 41 carrying cams that will be described below.

THE HOPPER 22 AND SLIDE 23 (FIGS. 1, 2 AND 5)

The hopper 22 and slide 23 may comprise a fixed lower and rear plate 43 and a forward and upper plate 44 that is mounted on screws 45 for adjusting the distance between the plate 44 and the plate 43, to take care of different spring diameters and assure that they will lie only one deep as they roll down along the slide 23. There are also vertical end plates 46 and 47. The springs 21 drop off one at a time from an outlet opening 48 at the bottom of the slide 23 (FIG. 5).

THE FEED-IN ASSEMBLY (FIGS. 4–7)

The springs 21 fall from the slide outlet 48 down a groove 50 between blocks 51 and 52 onto the shuttle plate 24. The shuttle plate 24 has a spring receiving slot 53 able to receive only one spring at a time. The plate 24 is connected through an extension spring 54 to the upper end 55 of a pivot arm 56 pivoted on a transverse portion of the frame 20. The lower end 57 of the arm 56 has a follower 58 that rides on a cam 60 on the rear cam shaft 41.

A cross bar 61 is secured to and depends from the shuttle plate 24 in between frame-mounted stationary stop bars 62 and 63. A pair of spring-loaded adjustment bolts 64 entered through holes 65 in the stop bar 62, are threaded through the cross bar 61, and in the forward position of the shuttle plate 24 bear against the stop bar 63. A pair of adjustable bolts 66 are screwed into the bar 62 and bear against the cross bar 61 when the shuttle plate 24 is in its rear position. Springs 67 are compressed between the bars 61 and 62 and urge the shuttle plate 24 toward a forward position as shown in FIG. 5.

The cam 60 is shaped to normally hold the shuttle plate 24 in its retracted rear position, but on each rotation of the cam shaft 41 the arm 56 is rocked about its pivot point 68, and the springs 67 urge the shuttle plate 24 forward to carry the spring 21 past the forward edge of an underlying base member 69 and drop it into the die 25, and then the shuttle plate 24 is retracted. The spring 54 helps avoid injury to the arm 56 and plate 24 in case one of them gets stuck and enables adjustment of the stroke of the shuttle plate without having to change cams.

THE DIE 25 AND DIE CARRIAGE ASSEMBLY 26
(FIGS. 1–3 AND 5)

The die carriage assembly 26 includes a rear carriage 70 and a front carriage 71 that are connected together by a lost-motion connection. They move fore-and-aft as guided and restrained by a stationary rail 72. A spring 73 connected to both carriages 70 and 71 tends to pull them toward each other. The rear carriage 70 has a tubular portion 74 that encircles and slides on the rail 72, and has a transverse arm 75. To the arm 75 is connected a rear element 76 of the die 25 (see FIGS. 3 and 5) the element 76 depending from the arm 75 and having a concave spring-receiving portion 77 that lies barely above a table 80.

The front carriage 71 has a tubular portion 81 that encircles and slides on the rail 72 and is connected to the tubular portion 74 by the spring 73. The carriage member 71 also has a transverse portion 82 to which is secured a forward element 83 of the die 25, with a depending convex portion 84 which is adapted to engage the spring 21 and force it against the concave portion 77, thereby flexing the spring 21 into a generally V-shape. The portion 82 also has two rearwardly extending members 85 and 86. The longer of these, the member 85, goes under the arm 75 of the rear carriage 70 and is used in tipping the carriage 71 at the forward end of its stroke to release the spring 21. The shorter member 86 engages a stationary stop 87 on the frame 20 to limit the rearward movement of the front carriage 71 on the rearward stroke, thereby opening the die 25 to receive a spring 21.

After the shuttle plate 24 deposits the spring 21 in between the two die members 77 and 84, the rear carriage 70 moves forward. This movement is accomplished by a cam 90 on the front camshaft 40. A carriage control arm 91 is mounted on a frame-supported pivot 92 and carries a follower 93 that engages the cam 90, being held thereagainst by a suitable spring means such as a constant-pressure air cylinder 94. A rod 95 extends up from the arm 91 through an opening 96 in the carriage 70. Hence the rotation of the shaft 40 rocks the arm 91 and rod 95 forward and back to move the rear carriage 70 fore and aft. As it moves forward, the die member 77 engages a spring 21 and closes it against the die member 84; hence the carriage 70 thenceforth moves the carriage 71 and the spring 21 forward. On the return stroke the front carriage 71 is stopped by its member 86 engaging the stop 87, and the rear carriage 70 is carried further, stretching the spring 73 and opening the die 25 for reception of another spring 21.

As the die carriage assembly 26 is moved forward, the spring 21 is moved between the pair of converging guides 27 and 28. The spring ends A and B engage the guides 27 and 28 and are moved toward each other so that they can be moved into the transverse guides 30 and 31, which turn the ends A and B inwardly so that the spring 21 is almost looped, though its ends A and B are still apart.

At the end of the forward stroke of the die carriage assembly 26, a spring-loaded push rod 97 is moved up through the table 80 and engages the member 85 to swing the front carriage 71 up a small amount so as to disengage the die member 84 and release the spring 21. Then the push rod 97 is retracted and the spring 73 pulls the front carriage 71 back with the rear carriage 70. The push rod 97 is normally urged down by a spring 98, but it is elevated at the proper time by a cam 99 on the shaft 40, the cam 99 being engaged by a follower 100 mounted on a rod holder 101 to which the rod 97 is rigidly secured.

JOINING THE SPRING ENDS
(FIGS. 3 AND 8–10)

Two pairs of knurled rollers 34, 35 and 36, 37 are provided, one for each end A and B of the spring 21. One pair of non-rotatable knurled rollers 36, 37 is mounted on a transversely movable carriage 38. The other pair of rollers 34, 35 are rotatably mounted on a stationary support member 102.

Associated with each pair of rollers 34, 35 and 36, 37 is an idler lever 32 or 33, each pivotally mounted on an idler lever stud 103, 104 and each having an upper shaped end 105 (FIG. 8). At the lower end of each lever 32, 33 a cam follower 106 is held against a cam 107 on the camshaft 40 by a spring 108 anchored to the frame 20. The stud 103 for the lever 32 is supported on the member 102, while the stud 104 for the lever 33 is supported on the movable carriage 38. The cam 107 causes the levers 32, 33 to be retracted when the spring 21 is moved against the transverse guide members 30 and 31 and then to push the respective spring ends A and B against the rollers 34, 35 and 36, 37. At the same time, the levers 32, 33 act through the spring 21 to force the transverse guide members 30 and 31 back against the pressure of springs 108, 109 each of which is anchored to the associated stud 103, 104 so that the spring ends A and B are clamped in place when they move in between the rollers.

The rollers 34, 35 are provided with geared portions 110, 111 that engage a pinion gear 112 (FIG. 10). The gear 112 is mounted rotatably on a stationary shaft 113 and is rigidly connected to an arm 114. The outboard end of the arm 114 is mounted rotatably on a pivot pin 115 near the end of cocking arm 116. The arm 116 is provided with a lengthwise slot 117 through which passes the front camshaft 40. Below the lower end of the slot 117 the arm 116 has a cam follower 118 that is held in engagement with a cam 119 by an extension spring 120 (see FIG. 9). The cam 119 causes the arm 116 to move up and down along an angular path, with the result that the arm 114 cranks the pinion gear 112 first in one direction and then an equal amount in the opposite direction, thereby moving the rollers 34, 35 first in one direction and then, after a brief dwell provided by the cam 119, in the other direction. An adjustable stop 121 limits the cranking stroke of the arm 116 by engagement of the arm 114.

The carriage 38 is mounted by a pair of sleeve bearings 122 on a pair of shafts 123 that are parallel to the front camshaft 40. (The stop 121 is secured in one shaft 123.) A spring 124 holds a follower 125 supported by the carriage 38 against a cam 126 on the shaft 40; so the carriage 38 moves back and forth parallel to the camshaft 40.

The cams 119, 126 and 107 are timed by the camshaft 40, so that the cam 119 first causes the spring end A to be twisted a fixed amount in one direction, then the cam 126 moves the untwisted spring end B toward the twisted end A, one going inside the other, then the cam 119 reverses the twist of the end A exactly the same amount as the original twist, producing a hooked garter spring 127. As soon as this is done, the cam 107 moves the idler arms 32 and 33 away from the rollers 34, 35, 36, 37, and the springs 108 and 109 help to expel the spring 127 by pushing the transverse guide arms 30 and 31 away from the rollers. A suitable cam operated kicking device may be used to insure expelling of the completed spring 127; such a device may include a pivoted arm 130 (see FIG. 9) in between the arms 30 and 31, with an offset 131 having a follower 132 riding on a cam 133. After release of the spring 127, the cam 126 moves the carriage 38 back away from the rollers 34 and 35.

Operation

Springs 21 are put into the hopper 22, either end being disposed toward either side. They slide down the slide 23 and are picked up one at a time by the slot 53 in the shuttle plate 24. The plate 24 carries the spring 21 over and drops it into the opened die 25, synchronization being assured by the camshafts 40 and 41. The rear die carriage 70 moves forward closing the die 25, picking up the front die carriage 71, and flexing the spring 21. More forward movement carries the spring 21 along the guides 27 and 28 and puts the spring ends A and B into and beyond the guides 30 and 31. The idler levers 32 and 33 clamp the spring ends A and B against the rollers 34, 35 and 36, 37, while the front carriage 71 is tipped up by the push rod 97, releasing the spring from the die assembly 26 before the die assembly moves back toward the rear, where the die 25 is opened by the stops 87 and 86 and the lost-motion connection. The rollers 34 and 35 twist the spring end A; the carriage 38 moves the spring end B toward the end A, one end going inside the other; the rollers 34 and 35 reverse-twist the spring end A exactly the amount of the original twist; the idler levers 32, 33 release the finished garter spring 127; the springs 108 and 109 push out the guides 30 and 31 and the spring 127 and the arm 130 kicks out the spring 127 from the guides 30 and 31; and the carriage 38 moves the rollers 36 and 37 back to the original position.

To those skilled in the art to which this invention relates, many additional changes in construction and widely differing embodiments of the invention will suggest themselves without departing from the spirit and scope of the invention as defined in the claims.

What is claimed is:

1. A machine for joining together the ends of short helical springs to make a small garter spring, including in combination:

die means for holding a center portion of said spring with the spring ends extending forwardly and out at an angle, means for carrying said die means and spring forward, guide means for engaging the ends of the spring during forward movement thereof to direct them toward each other, means for grasping and holding both ends of said spring opposite each other at the end of the forward stroke, means for removing said spring from said die means as soon as said means for grasping and holding has grasped and is holding said spring, means for moving said empty die means back to receive another spring, means, operating after said spring has been grasped and while it is being held by said means for grasping and holding, for rotating one said spring end a fixed amount in one direction and then, after a brief dwell, moving it back exactly the same amount, and means for moving the other said spring end toward said rotated end during the dwell.

2. The machine of claim 1 wherein said die means comprises a convex die member and a concave die member, means normally urging said members toward each other, and means for separating them when inserting a spring therein.

3. A machine for joining together the ends of short helical springs to make a small garter spring, including in combination:

die means for holding a center portion of said spring with the spring ends extending forwardly and out at an angle, said die means comprising a convex die member and a concave die member, means normally urging said members toward each other, and means for separating them when inserting a spring therein, means for carrying said die means and spring forward, guide means for engaging the ends of the spring during forward movement thereof to direct them toward each other, means for grasping and holding both ends of said spring opposite each other at the end of the forward stroke, means for removing said spring from said die means comprising means for tilting the die member lying closer to said means for grasping and holding, when said means for grasping and holding have engaged said spring, to tilt that said die member and release said spring from said die means, means for moving said empty die means back to receive another spring, means for rotating one said spring end a fixed amount in one direction and then, after a brief dwell, moving it back exactly the same amount, and means for moving the other said spring end toward said rotated end during the dwell.

4. A machine for joining together the ends of short helical springs to make a small garter spring, including in combination:

a die comprising a rear die member and a forward die member both shaped to hold a center portion of a said helical spring between them with the ends of the spring extending forwardly and out at an angle, means for feeding one straight said helical spring to said die and for clamping it between said die members, means for reciprocating said die forward and backwards, means for opening said die at the rear end of the stroke for reception of said spring for movement with said die on the forward stroke, means for engaging the ends of the spring during forward movement thereof to direct them toward each other, means for holding both ends of said spring opposite each other at the end of the forward stroke, means for tilting the forward die member at the end means for then rotating one said spring end a fixed amount in one direction and then, after a brief dwell, rotating it back exactly the same amount, and means for moving the other said spring end toward said rotated end after the rotation in said one direction and before it is rotated back.

5. A machine for joining together the ends of short helical springs to make a small garter spring, including in combination:
- a die comprising a concave rear die member and a forward convex die member shaped to hold a center portion of a said helical spring between them with the spring ends extending forwardly and out at an angle,
- a lost-motion spring-urged connection between said die members for normally moving them forward and back together,
- a shuttle plate having a slot for receiving one said helical spring at a time,
- means for opening said die at the rear end of its stroke of the forward stroke for release of said spring from said die when said means for holding has engaged both ends of said spring,
- and for simultaneously moving said shuttle plate to drop one said helical spring into said die between said die members, said helical spring being flexed forwardly when said die closes and as said die moves forward,
- a pair of stationary side guides converging toward each other for engaging the ends of said helical spring during forward movement thereof to direct them toward each other,
- a pair of spring-mounted spring-end guide members extending transversely to direct said spring ends opposite to each other,
- two pairs of rollers,
- means for clamping both ends of said helical spring against said rollers and opposite each other and for pushing said spring-end guide members back against said helical spring at the end of the forward stroke,
- means for rotating the rollers against which one said spring end is clamped a fixed amount in one direction and then, after a brief dwell, rotating it back exactly the same amount,
- means for moving the rollers against which the other said spring end is clamped toward said rotated end during the dwell, and
- means for releasing the clamping means after the rotating back, so that said spring-urged spring end guide means forces the joined said spring away from said rollers and ejects it.

6. A machine for joining together the ends of short straight helical springs to make a small garter spring, including in combination:
- a hopper into which the straight springs are introduced,
- a slide exit from the hopper causing the straight springs to go down the slide successively, one deep,
- a shuttle plate for feeding one spring at a time dropping from the slide to a feed position,
- a die comprising a rear die member and a forward die member between which the spring is fed by the shuttle plate, said die being shaped to hold said springs in a V with the vertex at the rear,
- a die carriage assembly comprising a rear carriage carrying said rear die and a forward carriage carrying said forward die,
- lost motion connection means for stopping said front carriage before said rear carriage is stopped in said feed position at the rear end of the stroke, to open said die for reception of said spring,
- converging straight guide members between which said die moves said spring, in the forward stroke, to converge the ends thereof,
- transverse guide members for engagement by the spring near the end of the forward stroke of said die carriage assembly to guide the spring ends toward each other,
- a pair of first rollers supported rotatably on a stationary shaft,
- means for rotating said rollers a fixed amount in one direction and then, after a brief dwell, moving them back exactly the same amount,
- a transversely movable roller carriage,
- a pair of stationary second rollers mounted on said carriage and carried thereby toward and away from said first rollers,
- means for clamping said spring ends against said first and second rollers and for releasing said spring from said die, and
- means for moving said roller carriage toward said first rollers after said first rollers have been rotated in one direction and moving away therefrom after the first rollers have been rotated in the other direction.

References Cited by the Examiner

UNITED STATES PATENTS

| | | | |
|---|---|---|---|
| 2,696,226 | 12/1954 | Kane | 140—88 |
| 3,079,956 | 3/1963 | Smith et al. | 140—71 |
| 3,151,635 | 10/1964 | Levine | 140—71 |

FOREIGN PATENTS

| | | |
|---|---|---|
| 928,644 | 6/1955 | Germany. |

CHARLES W. LANHAM, *Primary Examiner.*